(12) United States Patent
Yonak

(10) Patent No.: US 7,532,152 B1
(45) Date of Patent: May 12, 2009

(54) AUTOMOTIVE RADAR SYSTEM

(75) Inventor: Serdar H. Yonak, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/944,824

(22) Filed: Nov. 26, 2007

(51) Int. Cl.
G01S 13/93 (2006.01)
G01S 13/00 (2006.01)
H04L 27/148 (2006.01)

(52) U.S. Cl. .......................... 342/70; 342/27; 342/28; 342/89; 342/91; 342/175; 342/176; 342/182; 342/189; 342/195; 342/196; 375/316; 375/340; 375/343

(58) Field of Classification Search .................. 342/21, 342/22, 27, 28, 70–72, 82–103, 175, 176, 342/179, 182, 183, 189–197; 340/425.5, 340/435, 436, 500, 540, 541, 552–554, 901–904; 235/462.15; 375/130–153, 316, 340, 343
See application file for complete search history.

(56) References Cited

U.S. PATENT DOCUMENTS

| | | | | |
|---|---|---|---|---|
| 3,163,861 A | * | 12/1964 | Suter | 342/28 |
| 3,383,678 A | * | 5/1968 | Palmber | 342/28 |
| 3,697,985 A | * | 10/1972 | Faris et al. | 342/72 |
| 3,781,859 A | * | 12/1973 | Hermans | 342/28 |
| 3,796,208 A | * | 3/1974 | Bloice | 342/28 |
| 3,882,495 A | * | 5/1975 | Bolger | 340/554 |
| 3,983,558 A | * | 9/1976 | Rittenbach | 342/193 |
| 4,051,472 A | * | 9/1977 | Albanese et al. | 342/28 |
| 4,072,945 A | | 2/1978 | Katsumata et al. | |
| 4,195,289 A | * | 3/1980 | Cole | 340/554 |
| 4,632,543 A | | 12/1986 | Endo et al. | |
| 4,792,804 A | * | 12/1988 | Rubechini | 342/27 |
| 4,861,972 A | * | 8/1989 | Elliott et al. | 235/462.15 |
| 5,019,822 A | * | 5/1991 | Kirkland | 342/22 |
| 5,049,858 A | * | 9/1991 | Price | 340/552 |
| 5,081,585 A | | 1/1992 | Kurami et al. | |

(Continued)

FOREIGN PATENT DOCUMENTS

CA    1020653    11/1977

(Continued)

OTHER PUBLICATIONS

Nanzer et al., A Ka-band Correlation Radiometer for Human Presence Detection for a Moving Platform, The University of Texas Applied Research Laboratories, Austin, TX, pp. 385-388.

(Continued)

*Primary Examiner*—Bernarr E Gregory
(74) *Attorney, Agent, or Firm*—Gifford, Krass, Sprinkle, Anderson & Citkowski, P.C.

(57) ABSTRACT

An automotive radar system having a high frequency radio transmitter which generates a radar signal in a known direction. A high frequency radio receiver receives echoes from the radar signal in which each echo represents a reflection of the radar signal from an object. A processor then identifies animate objects, if any, from the received echoes within a range of interest and generates an alert signal for each such identified animate object.

12 Claims, 4 Drawing Sheets

U.S. PATENT DOCUMENTS

| | | | |
|---|---|---|---|
| 5,319,350 A | | 6/1994 | DeMarco et al. |
| 5,337,053 A | * | 8/1994 | Dwyer .................. 342/90 |
| 5,343,206 A | | 8/1994 | Ansaldi et al. |
| 5,479,173 A | | 12/1995 | Yoshioka et al. |
| 5,585,798 A | | 12/1996 | Yoshioka et al. |
| 5,594,414 A | | 1/1997 | Namngani et al. |
| 5,699,057 A | | 12/1997 | Ikeda et al. |
| 5,734,336 A | | 3/1998 | Smithline |
| 5,979,586 A | | 11/1999 | Farmer et al. |
| 5,999,092 A | | 12/1999 | Smith et al. |
| 6,031,482 A | * | 2/2000 | Lemaitre et al. .......... 342/22 |
| 6,115,651 A | * | 9/2000 | Cruz .................. 340/436 |
| 6,130,607 A | * | 10/2000 | McClanahan et al. ...... 340/436 |
| 6,208,248 B1 | * | 3/2001 | Ross .................. 340/552 |
| 6,269,307 B1 | | 7/2001 | Shinmura et al. |
| 6,408,247 B1 | | 6/2002 | Ichikawa et al. |
| 6,813,562 B2 | | 11/2004 | Altan et al. |
| 6,861,972 B2 | * | 3/2005 | Britton et al. .......... 342/70 |
| 6,903,677 B2 | | 6/2005 | Takashima et al. |
| 7,009,503 B2 | | 3/2006 | Gross |
| 7,046,128 B2 | | 5/2006 | Roberts |
| 7,102,496 B1 | | 9/2006 | Ernst, Jr. et al. |
| 2005/0024257 A1 | * | 2/2005 | Britton et al. .......... 342/70 |
| 2006/0091654 A1 | | 5/2006 | De Mersseman et al. |
| 2006/0190175 A1 | | 8/2006 | Moriizumi et al. |

FOREIGN PATENT DOCUMENTS

| | | |
|---|---|---|
| EP | 1691213 | 8/2006 |
| FR | 2717131 | 9/1995 |
| JP | 2000310677 | 11/2000 |
| JP | 2003315452 | 11/2003 |
| WO | WO-06/086605 | 8/2006 |

OTHER PUBLICATIONS

Changzhi et al., Non-Contact Measurement of Periodic Movements by a 22-40GHz Radar Sensor Using Nonlinear Phase Modulation, University of Florida, Gainesville, FL, pp. 579-582.

Vahidpour et al., Millimeter Wave RCS and Doppler Spectrum of Walking Human and Dog, Radiation Lab., EECS Dept., University of Michigan, Ann Arbor, pp. 4004-4007.

Xiao et al., Accuracy of A Low-Power Ka-Band Non-Contact Heartbeat Detector Measured from Four Sides of A Human Body, Department of Electrical & Computer Engineering, University of Florida, Gainesville, FL, pp. 1576-1579.

Yamada et al., Radar Cross Section for Pedestrian in 76GHz Band, R&D Review of Toyota CRDL vol. 39 No. 4, pp. 46-51.

* cited by examiner

AUTOMOTIVE RADAR SYSTEM

BACKGROUND OF THE INVENTION

I. Field of the Invention

The present invention relates generally to automotive radar systems and, more particularly, to such a system which identifies animate objects within a range of interest.

II. Description of Material Art

There are previously known automotive radar systems and such automotive radar systems are expected to become more prevalent in the future. These automotive radar systems typically comprise a high frequency radar transmitter which transmits a radar signal in a known direction. The transmitter may transmit the radar signal in either a continuous or pulse mode.

These systems also include a receiver connected to the appropriate antenna system which receives echoes or reflections from the transmitted radar signal. Each such reflection or echo represents an object struck by the transmitted radar signal.

To date, the use of automotive radar has been generally limited to collision avoidance systems. For example, in some radar systems, the system detects the distance between the vehicle immediately forward of the vehicle having radar. Whenever the distance between the two vehicles falls less than a predetermined amount, which may vary as a function of speed, the radar system either generates an alert to the driver or automatically slows the vehicle down to increase the spacing between the vehicle and the next forward vehicle.

Still other automotive radar systems detect the distance of objects within the direction of travel of the automotive vehicle and take necessary steps to avoid collision with those objects.

There are situations, however, where an object is outside the direction of travel of the vehicle but may move into the direction of travel of the vehicle and cause a collision. For example, animals, such as deer, as well as people may move suddenly into the path of travel of the vehicle and cause a collision. These previously known radar systems have been unable to discriminate between animate objects which may move into the path of travel of the vehicle and inanimate objects.

SUMMARY OF THE PRESENT INVENTION

The present invention provides an automotive radar system which overcomes the previously known disadvantages of the prior systems.

In brief, the automotive radar system of the present invention comprises a high frequency radio transmitter which generates a radio signal in a known direction relative to the vehicle. The radio transmitter may generate the radar signal in either a pulse mode or continuous mode.

The radar system further includes a radar receiver having two or more antennas that receive reflections or echoes of the radar signal resulting from impingement with an object. The position and distance for each such identified object is then provided as input data to a processor.

The processor, by analyzing the received data for each object over a period of time, then discriminates between animate objects and inanimate objects. The identification of animate objects may be achieved in several different ways.

First, all animate objects of interest, such as people and other mammals, continually exhibit certain movements. For example, such animate objects have a continuous heartbeat, respiration and the like, all of which results in amplitude modulation of the reflected signal back to the automotive vehicle. Consequently, identification of amplitude modulation in the reflected signal over a period of time is indicative that the object is animate.

Similarly, the reflected radar signal may be compared to a matched set filter contained as data in the processor for the radar system. The filters may contain both animate as well as inanimate objects so that, once a match has been made, the identification of the object as an animate or inanimate object may be rapidly determined.

Once the animate objects have been identified, the processor provides an alert signal to the operator of the vehicle. In one embodiment of the invention, the vehicle includes a video display screen and the alert signal comprises displaying video objects on the screen which correspond to the animate objects identified by the radar system. Other alert signals, such as an audible signal, may also be employed.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
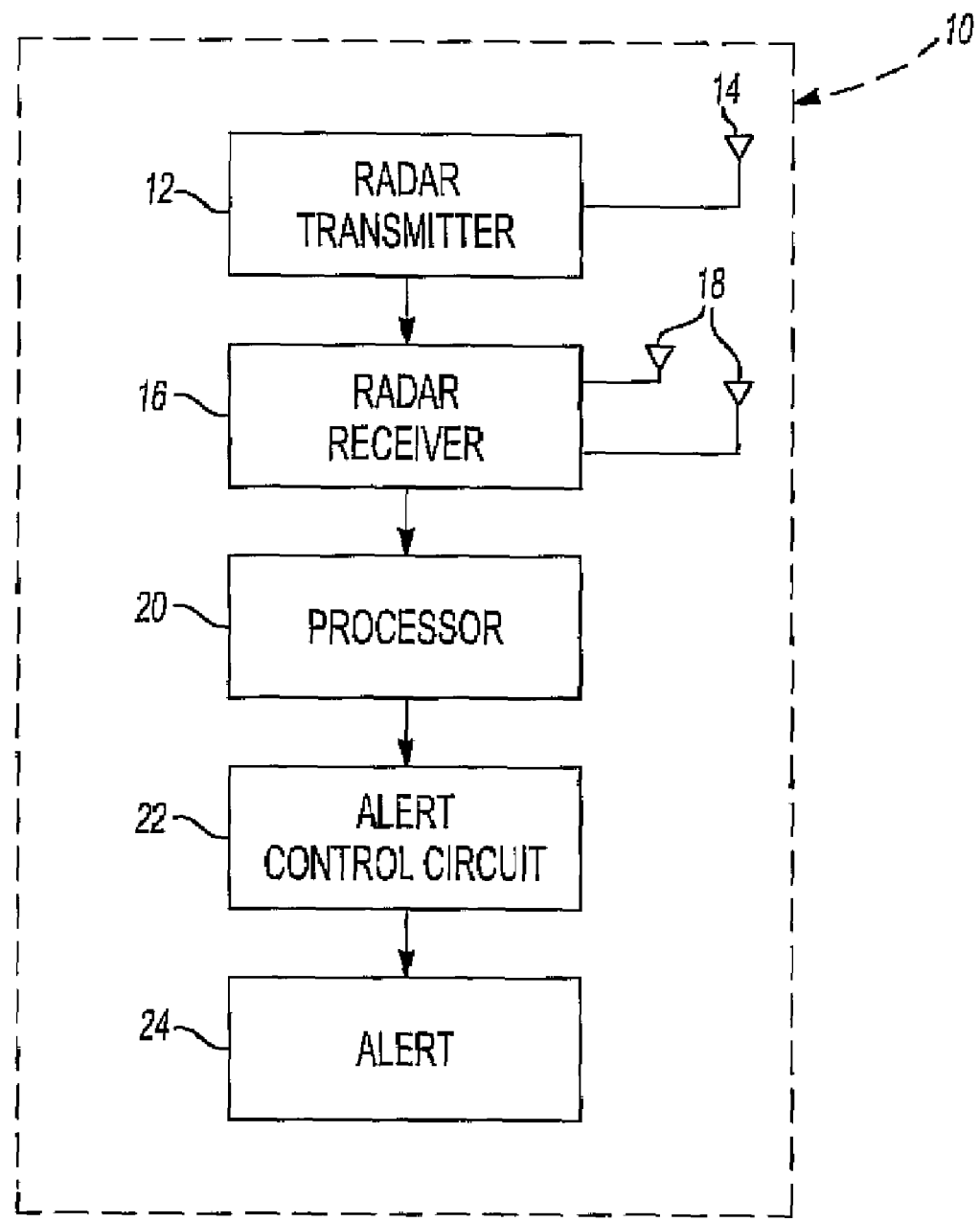
FIG. 1 is a block diagrammatic view of a preferred embodiment of the present invention.
Figure 2:
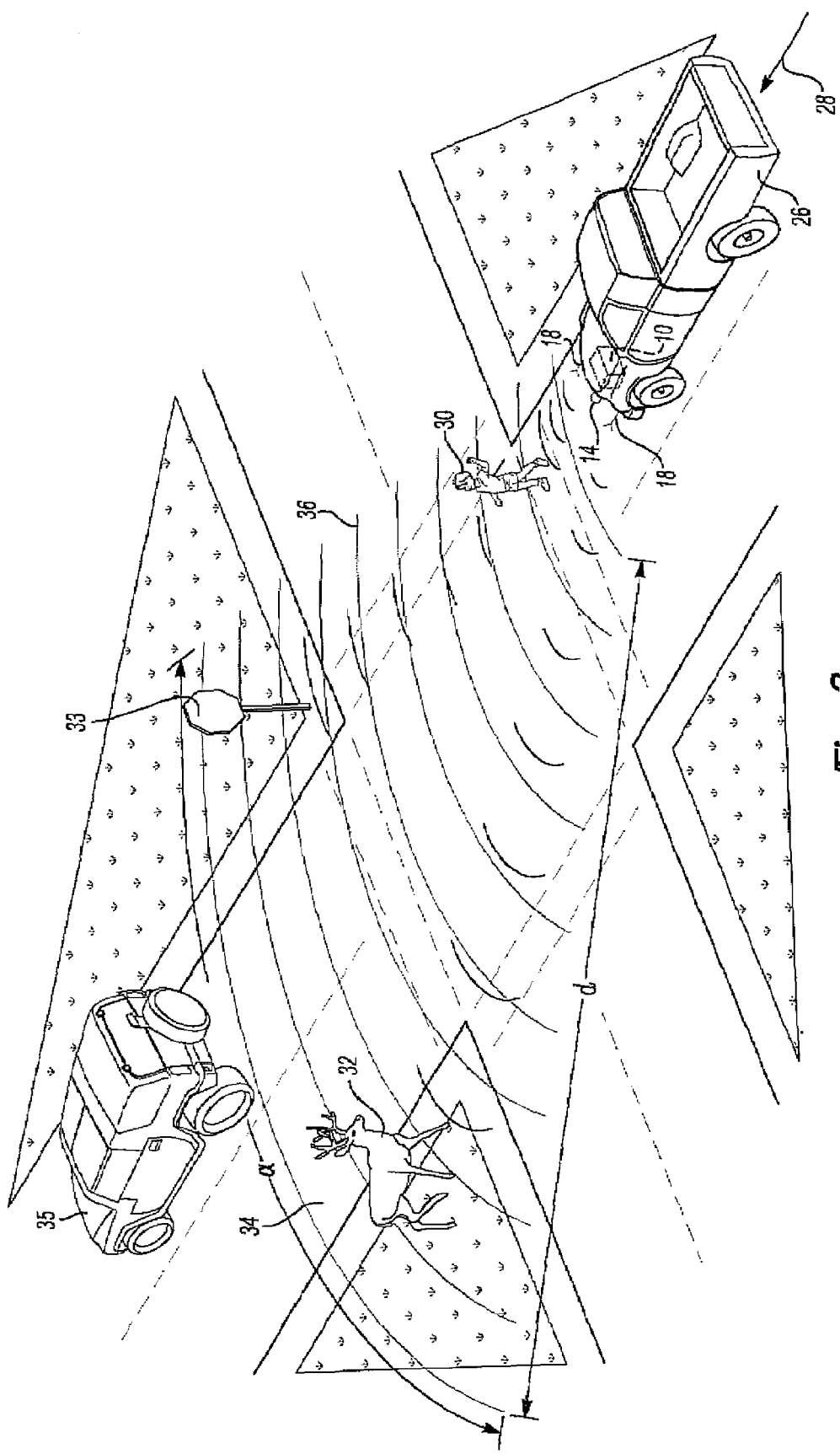
FIG. 2 is an elevational diagrammatic view illustrating the operation of the present invention.

With reference first to FIG. 1, a block diagrammatic view of a preferred embodiment of the radar system 10 according to the present invention is shown. The radar system 10 includes a high frequency radio transmitter 12 which generates a radar signal through a radar antenna 14 in a known direction, typically forwardly, relative to a vehicle 26 (FIG. 2). At present, governmental regulations allow automotive radar in the range of 76-81 GHz, although other frequency ranges may become available or mandated for use in automotive systems in the future.

The radar system 10 further includes a radar receiver 16 having at least two antennas 18 that are physically spaced apart on the automotive vehicle 26. Such spaced apart antennas 18 allow the radar system to identify the position of any received signals by the antennas 18 through triangulation, phase shifting processing or other means.

The radar receiver 16 provides an output to a processor 20 indicative of the echo(es) or radar signal reflection received by the receiver 16. The information provided to the processor 20 enables the processor to determine both the position and distance between any objects detected by the radar receiver 16.

The processor 20, which is preferably microprocessor based, analyzes the data received from the radar receiver 16 to identify and discriminate between animate objects and inanimate objects that are within a range of interest. The algorithm utilized by the processor 20 to identify animate objects will be subsequently described in greater detail.

After the processor 20 identifies animate objects within a range of interest, the processor 20, through an alert control circuit 22, generates an alert 24 to the operator of the vehicle 26. This alert 24 may comprise, for example, a video display of the animate objects on a video display screen accessible to the operator of the vehicle or other audible or visual alerts. The alert 24 may also include automatic control of the vehicle 26, e.g. automatic braking of the vehicle 26.

With reference now to FIG. 2, the automotive radar system 10 is there shown installed in the vehicle 26 which is either stationary or traveling in the direction of arrow 28. It is only desirable to identify animate objects, such as a person 30 or a deer 32, which may move into the path of travel of the vehicle 26. Consequently, it is only necessary to examine the objects, both animate and inanimate, that are within a certain range of interest 34. The range of interest 34 may, for example, include both an angular range α as well as a distance range d, either of which may vary as a function of the speed of the vehicle 26.

Figure 3:
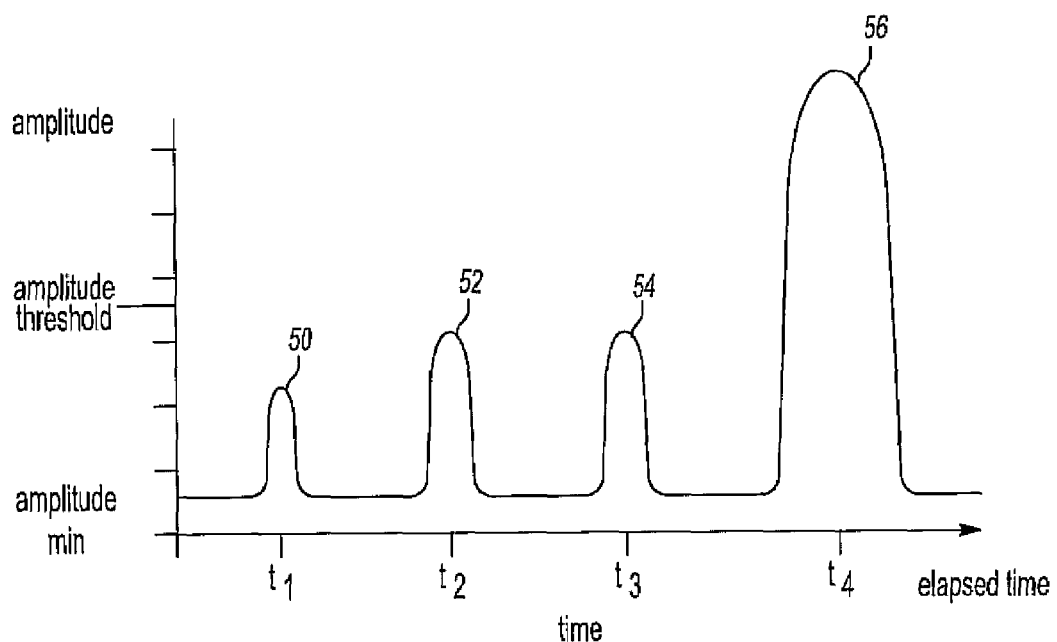
FIG. 3 is a graph illustrating the receipt of exemplary radar echoes corresponding to objects within the range of interest.

With reference now to FIGS. 2 and 3, the radar transmitter generates the high frequency radio signal through the antenna 14 as illustrated at radar signal 36 (FIG. 2) in the well known manner. Furthermore, the transmission of the high frequency radio signal through the antenna 14 may be either in pulse mode or continuous mode.

Whenever the radar signal 36 impinges upon an object within the range of interest 34, that object reflects the radar signal 36 back to the receiving antennas 18 on the motor vehicle 26. This reflected signal or echo from both the inanimate objects 33 and 35, as well as the animate objects 30 and 32, enables each of the objects 30, 32, 33 and 35 to not only be located but also, ultimately, to be identified as either an animate or an inanimate object.

First, the time lapse between the transmission of the radar signal by the antenna 14 and the receipt of the echo from each object determines the distance between the object and the vehicle 26. The phase shift between the receiving antennas 18 of each echo enables the angular position of the object relative to the vehicle 26 to be determined. Since both the angular position as well as the distance is determinable within the range of interest 34, the position of each object 30, 32, 33 and 35 may be calculated by the processor 20.

The amplitude of the echo will vary depending upon the type of object within the area of interest 34. An exemplary received radio signal for the scenario illustrated in FIG. 2 is shown in FIG. 3 with the amplitude of the echo charted as a function of time $t_{long}$.

With reference then to FIGS. 2 and 3, a first echo 50 indicated at elapsed time $t_1$, i.e. the elapsed time between the transmission of the radar signal and the receipt of the echo, corresponds to the nearest object or the person 30 as shown in FIG. 2. Similarly, a second echo 52 corresponds to the next further object or the deer 32 while a third echo 54 corresponds to the stop sign 33. An echo 56 corresponds to the vehicle 35 immediately in front of the vehicle 26. Furthermore, as shown in FIG. 3, the amplitude of the radar echo from the automotive vehicle 35 is much greater than the amplitude of the echoes from either the person 30, deer 32 or stop sign 33 since the automotive vehicle 35 is not only largely metallic in construction, but also much larger than the other objects.

Figure 4:
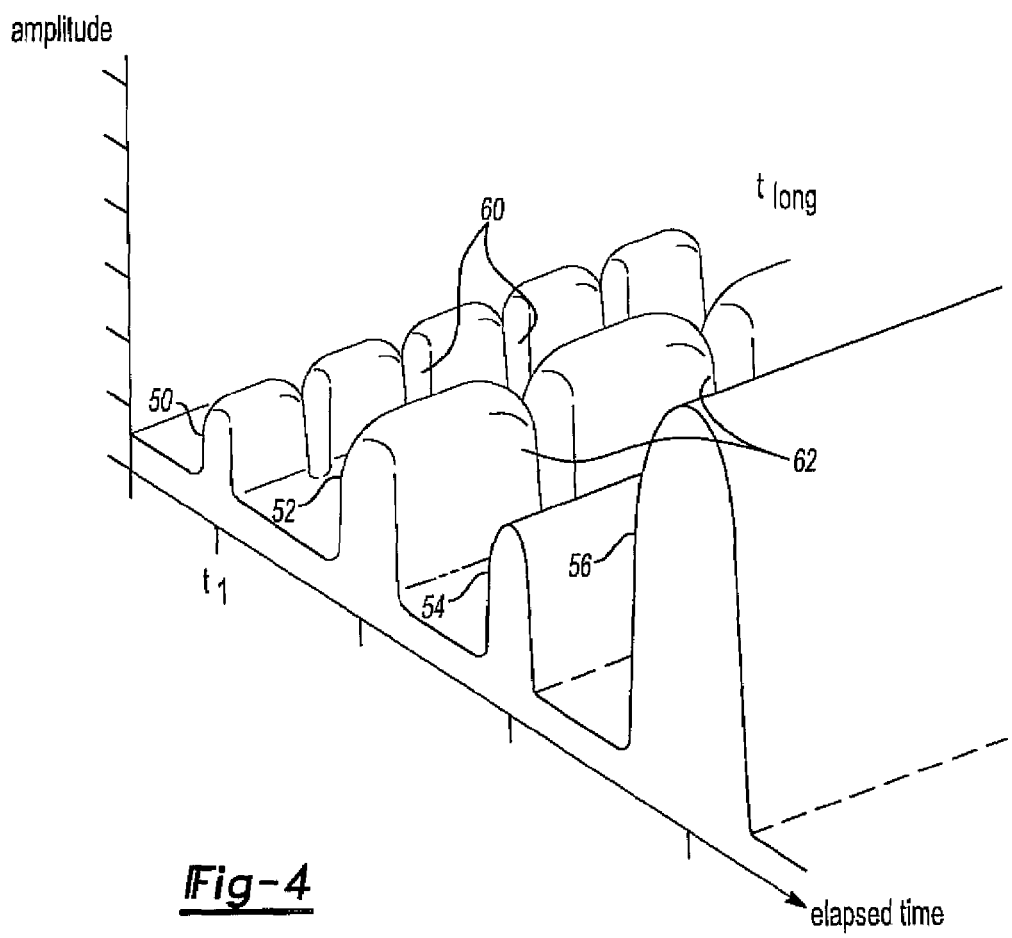
FIG. 4 is a view similar to FIG. 3 but illustrating the received signal over an extended time period.

With reference now to FIG. 4, a graph of the received echoes by the antenna is shown over an extended period of time tong. For simplicity, FIG. 4 also depicts the received radar echoes with the vehicle 26 stationary; otherwise the echoes 50, 52, 54 and 56 would shift along the elapsed time axis as the distance between the objects 30, 32, 33 and 35 changes. Consequently, the echo or reflection signal 50 from the person 30 will include different amplitude modulations 60 at spaced time intervals. This amplitude modulation may result from respiration of the person, the person's heartbeat, and/or the like.

Similarly, the echo signal 52 from the deer 32 would also contain amplitude modulations 62 at spaced time intervals. These amplitude modulations 62, however, presumably would be different than the amplitude modulation exhibited by the person 30.

Conversely, the received radar echo 54 from the stop sign 33, as well as the received echo 56 from the vehicle 35 in front of the vehicle 26, would not exhibit this type of amplitude modulation since both are inanimate objects. Furthermore, the echo signal 56 from the vehicle 35 is greater than a threshold $Amp_{thresh}$ (FIG. 3) which represents an echo signal larger than any expected animate object.

Figure 5:
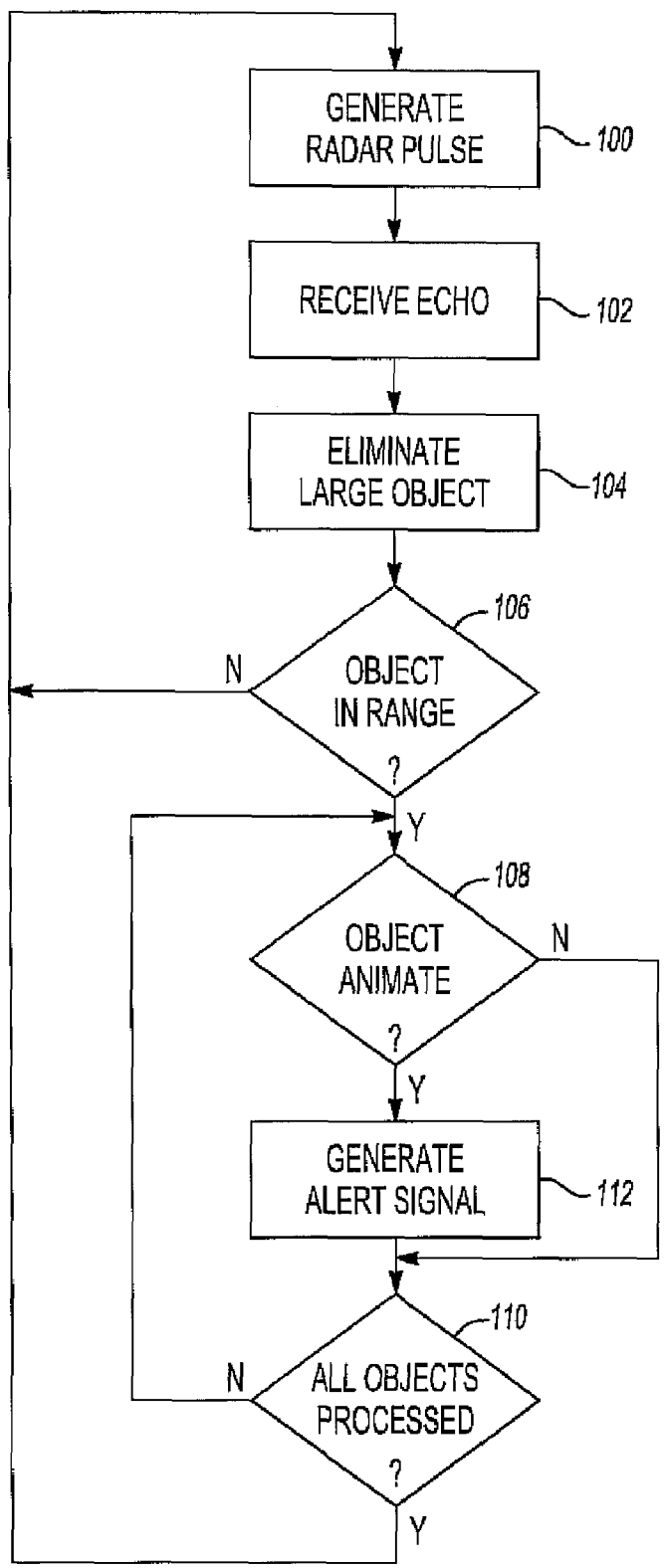
FIG. 5 is a flowchart illustrating the operation of a preferred embodiment of the present invention.

With reference now to FIGS. 1 and 5, the operation of the radar system of the present invention is there illustrated in greater detail. At step 100 the radar transmitter 12 generates a microwave radar signal, preferably in the range of 76-81 GHz, through the antenna 14 and in a known direction relative to the vehicle. In this example, that known direction corresponds to the area of interest 34 forwardly of the vehicle 26 and in the angular range α as shown in FIG. 2. Step 100 then proceeds to step 102.

At step 102, the radar receiver 16 receives the echoes from objects within the area of interest 34 through its antennas 18. Each received echo will vary both in amplitude, depending upon the object producing the echo, as well as the elapsed time between the transmission of the radar signal at step 100 and the receipt of its echo. Objects that are closer to the vehicle 26 will exhibit a shorter elapsed time between the transmission of the radar signal and the reception of its echo while, conversely, objects further from the vehicle 26 will exhibit a longer elapsed time between the transmission of the radar signal and the reception of its echo. Step 102 then proceeds to step 104.

In order to simplify processing, step 104 eliminates the received radar echoes having an amplitude in excess of $Amp_{thresh}$. Such reflections or echoes with large amplitudes would correspond to other automotive vehicles and thus inanimate objects. Step 104 then proceeds to step 106.

After elimination of the large objects corresponding to automotive vehicles, step 106 determines if there are any other objects that are identified within the range of interest. Consequently, for the example illustrated, the echo 56 corresponding to the vehicle 35 is eliminated from further processing at step 104 so that step 106 determines that there are three separate remaining objects, each corresponding to echoes 50, 52 and 54, and step 106 proceeds to step 108. However, if no objects are found within the range of interest at step 106, step 106 branches back to step 100 where the above process is repeated.

At step 108, the processor 20 determines whether the objects 30, 32 and 33 which respectively produce the return echoes 50, 52 and 54 are animate or inanimate. The identification of animate objects within the range of interest 34 may be accomplished in different ways.

For example, a plurality of echoes may be received over a relatively long period of time $t_{long}$ as illustrated in FIG. 4. Each echo 50, 52 or 54 is examined to determine if it exhibits amplitude modulation over that relatively long period of time. Such amplitude modulation can result from a heartbeat, respiration, actual movement of the inanimate object, and the like. In any event, once such amplitude modulation is identified, the processor 20 identifies the object as an animate object.

Alternatively, the received echoes from the radar transmission may be compared to match set filters that are previously determined and stored in memory accessible to the processor 20. Such filters may correspond to objects commonly found along highways, such as stop signs, speed limit signs, and the like. When the appropriate filter is applied to the received echo 50, 52 and 54, the object is accordingly identified as either animate or inanimate as the case may be.

If the object is identified as inanimate at step 108, step 108 branches to step 110 where the algorithm determines whether or not all objects within the range of interest 34 have been processed. If not, step 10 branches back to step 108 where the above process is repeated.

Conversely, in the event that the object is identified as an animate object which could potentially move into the path of travel of the vehicle 26, step 108 instead branches to step 112 where the processor 20 generates an alert signal 24 via the alert control circuit 22. This alert signal 24 may comprise, for example, the display of a symbol on a video display screen, or other alert signals.

Alternatively, the alert signal 24 can change the operation of the vehicle itself. For example, in the event of a possible collision with an animate object, the alert signal 24 may automatically apply the vehicle brakes to slow the vehicle or even steer the vehicle around the animate object.

From the foregoing, it can be seen that the present invention provides an automotive radar system which identifies animate objects within a range of interest and which may potentially enter into the path of travel of the vehicle. Having described my invention, however, many modifications thereto will become apparent to those skilled in the art to which it pertains without deviation from the spirit of the invention as defined by the scope of the appended claims.

I claim:

1. An automotive radar system comprising:
    a high frequency radio transmitter which generates a radar signal in a known direction,
    a high frequency radio receiver which receives echoes from said radar signal, each said echo representing a reflection of the radar signal from an object,
    a processor which identifies animate objects from said echoes within a range of interest, and
    said processor generating an alert signal for each identified animate object.

2. The invention as defined in claim 1 wherein said radar system further comprises a video display screen and wherein said alert signal comprises a figure display on said display screen.

3. The invention as defined in claim 1 wherein said radio transmitter generates said radar signal in the range of 76 GHz to 81 GHz.

4. The invention as defined in claim 1 wherein said processor identifies each animate object by comparing each object with a matched set filter.

5. The invention as defined in claim 1 wherein said processor identifies each animate object by detecting amplitude modulation of the received echoes over a period of time.

6. The invention as defined in claim 1 wherein said processor identifies each animate object by Fourier analysis.

7. A method for utilizing an automotive radar system comprising the steps of:
    transmitting a high frequency radar signal in a known direction,
    receiving echoes from said radar signal, each echo representing a reflection of the radar signal from an object,
    identifying animate objects within a range of interest as a function of said echoes,
    generating an alert signal for each identified animate object.

8. The invention as defined in claim 7 wherein said generating step comprises the step of displaying a symbol on a video screen.

9. The invention as defined in claim 7 wherein said identifying step comprises the step of detecting amplitude modulation of the received echoes from the animate object over a period of time.

10. The invention as defined in claim 7 wherein said identifying step comprises the step of comparing the received echoes from each object with a matched set filter.

11. The invention as defined in claim 7 wherein said identifying step comprises the step of disregarding received echoes greater than a predetermined threshold.

12. The invention as defined in claim 7 wherein said identifying step comprises the step of disregarding received echoes less than a predetermined threshold.

* * * * *

UNITED STATES PATENT AND TRADEMARK OFFICE
CERTIFICATE OF CORRECTION

PATENT NO. : 7,532,152 B1
APPLICATION NO. : 11/944824
DATED : May 12, 2009
INVENTOR(S) : Serdar H. Yonak It is certified that error appears in the above-identified patent and that said Letters Patent is hereby corrected as shown below:

Column 5, line 12 replace "10" with --110--

Signed and Sealed this

First Day of September, 2009

David J. Kappos
*Director of the United States Patent and Trademark Office*